Aug. 21, 1923.
W. PAPPAS ET AL
1,465,680
DISPENSING APPARATUS FOR SODA FOUNTAINS
Filed March 1, 1921
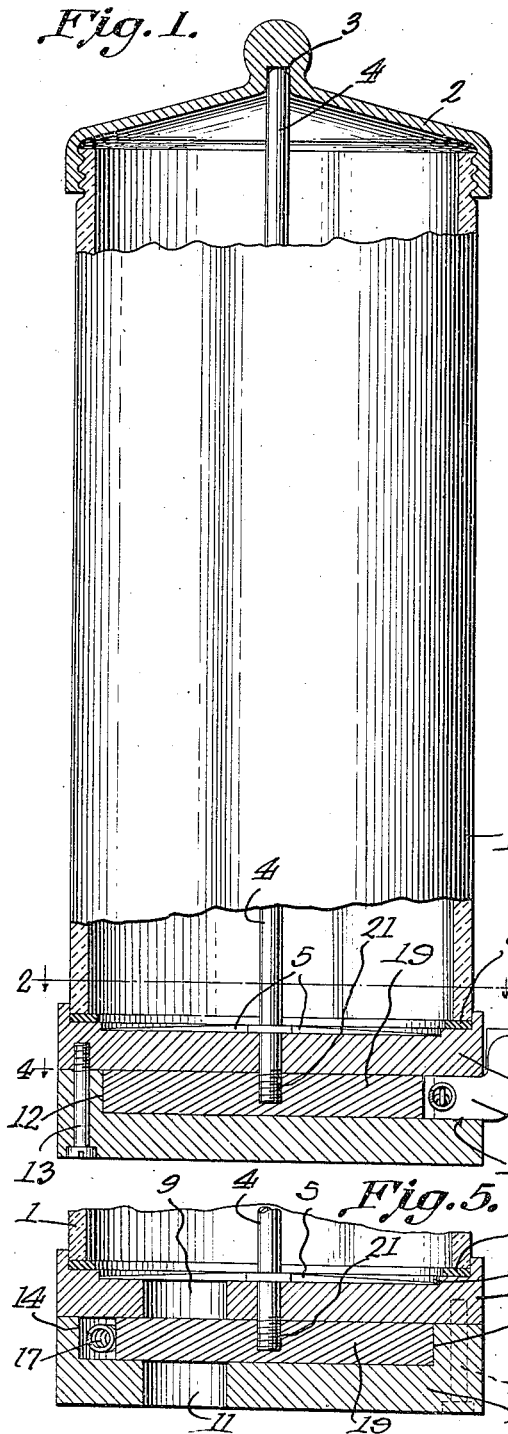
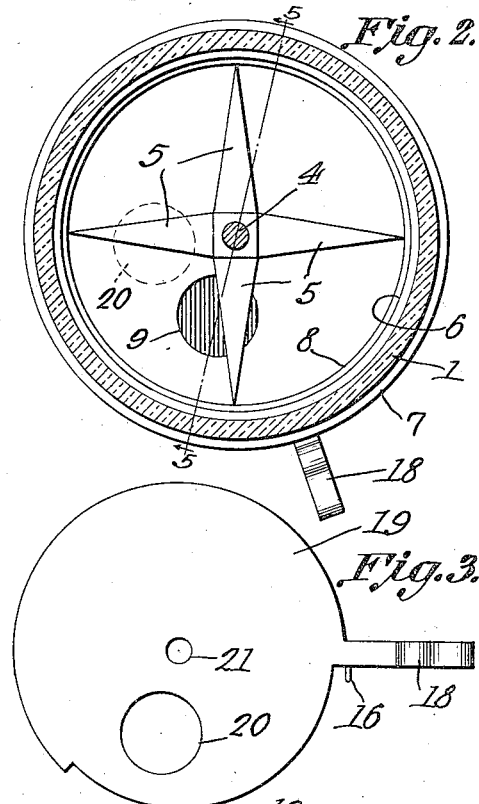
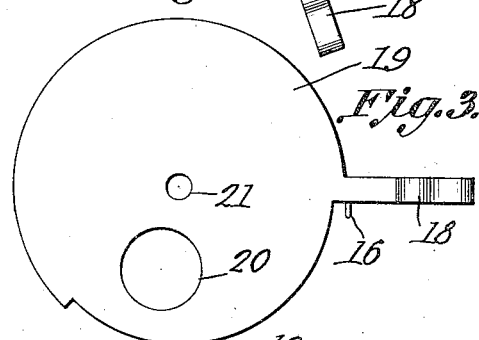
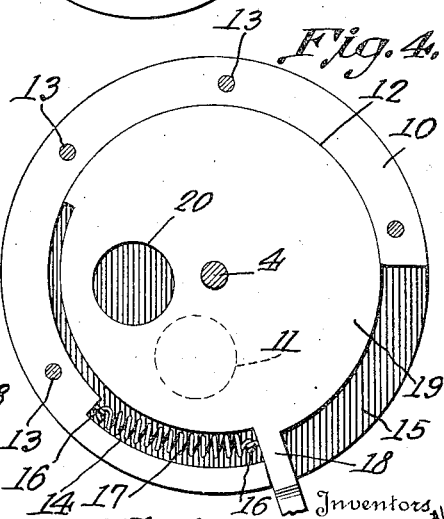
Inventors
William Pappas and
Peter Pappas
Lester L. Sargent.
Attorney Patented Aug. 21, 1923.

1,465,680

UNITED STATES PATENT OFFICE.

WILLIAM PAPPAS AND PETER PAPPAS, OF WEBSTER CITY, IOWA.

DISPENSING APPARATUS FOR SODA FOUNTAINS.

Application filed March 1, 1921. Serial No. 448,887.

*To all whom it may concern:*

Be it known that we, WILLIAM PAPPAS and PETER PAPPAS, citizens of the United States, and residents of Webster City, in the county of Hamilton and State of Iowa, have invented a new and useful Dispensing Apparatus for Soda Fountains, of which the following is a specification.

The object of our invention is to provide a novel, convenient and improved device for vending powdered substances at soda fountains, such as malted milk, bromo-seltzer, etc., and to provide novel means for keeping the contents of the dispenser free from dampness and in pulverized condition. We attain these and other objects of our invention by the device illustrated in the accompanying drawings, in which—

Figure 1 is a vertical section, partly in side elevation, of our complete device;

Fig. 2 is a horizontal section on line 2—2 of Fig. 1;

Fig. 3 is a detailed plan view of member 19;

Fig. 4 is a horizontal section on line 4—4 of Fig. 1; and

Figure 5 is a vertical section on line 5—5 of Fig. 2.

Like numerals designate like parts in each of the several views.

Referring to the accompanying drawings, we provide a suitable casing or container 1, on which is mounted a suitable screw top 2 provided with an interiorly chambered knob 3, which provides a bearing for the central rod 4. The latter member carries a suitable star-shaped pulverizing member 5 affixed to it and in proximity to the inner bottom plate 7, which is provided with a circular chambered portion 6 to accommodate the star member 5, as shown in Figs. 2 and 5. A suitable washer 8 is interposed between members 7 and 1, as shown in Figs. 1 and 5. Plate 7 is provided with a suitable, preferably round, discharge opening 9, as shown in Fig. 2. As shown in Fig. 1, we provide a rotatable valve 19, having a suitable, preferably round, opening 20 which may be brought into and moved out of alignment with the opening 9 in plate 7. Member 19 is provided with an operating handle 18. A suitable spring 17 attached to eyes 16 resiliently attaches valve 19 to the shoulder of the cut-out portion 14 of the bottom plate 10. The latter member is held in fixed position relative to the plate 7 by means of suitable bolts or screws 13, as shown in Figs. 4 and 5. Bottom plate 10 is provided with an opening 11 which normally is in alignment with the opening 9 of plate 7, since members 7 and 10 are held in a fixed relation. Bottom plate 10 is provided with an arcuate cut-out portion 14 to accommodate the spring 17, and is further provided with the arcuate slot 15, through which the handle 18 of valve 19 extends. The lower end of rod 4 is threaded and securely affixed to the rotatable valve 19, and rotates with that member, thus pulverizing the material in the lower portion of the container, when the valve is operated.

What we claim is:

In a dispensing apparatus for soda fountains, the combination with a suitable container of a bottom plate having an opening therethrough for the discharge of powdered substances, a second spaced bottom plate forming the bottom member of the container and having an opening permanently aligned with the opening in the first mentioned plate, an interposed manually rotatable valve having a corresponding opening movable into and out of registration with the openings in the spaced bottom plates, said valve having a projecting handle for its manual operation, the second bottom plate having a cutaway portion to permit the said handle to project therethrough and have a limited range of movement the interior of the bottom of the container having a recessed portion extending to the aforesaid cut-away portion, and a spring mounted in said recessed portion and operatively attached to the rotatable valve to normally close the valve opening.

WILLIAM PAPPAS.
PETER PAPPAS.